(12) United States Patent
Paraskevas

(10) Patent No.: US 8,245,610 B2
(45) Date of Patent: Aug. 21, 2012

(54) DEVICE FOR CUTTING BAR-SHAPED OR TUBULAR WORKPIECES

(76) Inventor: Elefterios Paraskevas, Aachen (DE)

( * ) Notice: Subject to any disclaimer, the term of this patent is extended or adjusted under 35 U.S.C. 154(b) by 560 days.

(21) Appl. No.: 12/227,880

(22) PCT Filed: May 24, 2007

(86) PCT No.: PCT/DE2007/000945
§ 371 (c)(1),
(2), (4) Date: May 6, 2009

(87) PCT Pub. No.: WO2007/137561
PCT Pub. Date: Dec. 6, 2007

(65) Prior Publication Data
US 2009/0301274 A1 Dec. 10, 2009

(30) Foreign Application Priority Data
May 31, 2006 (DE) .......................... 10 2006 025 812

(51) Int. Cl.
*B23B 5/12* (2006.01)
(52) U.S. Cl. .............................. 82/113; 82/128; 408/146
(58) Field of Classification Search .................... 82/113, 82/128, 101, 130, 131, 123; 408/146, 147, 408/152, 153
See application file for complete search history.

(56) References Cited

U.S. PATENT DOCUMENTS

| | | | | |
|---|---|---|---|---|
| 2,300,967 A * | 11/1942 | Reed et al. ........................ 82/130 |
| 3,744,358 A | 7/1973 | Lindemann |
| 4,114,484 A * | 9/1978 | Feamster, III .................... 82/113 |
| 4,291,600 A | 9/1981 | Kawaguchi et al. |
| 4,411,178 A * | 10/1983 | Wachs et al. ..................... 82/113 |
| 4,739,685 A * | 4/1988 | Ricci ............................. 82/113 |
| 4,770,074 A * | 9/1988 | Kwech ............................ 82/113 |
| 4,813,314 A * | 3/1989 | Kwech ............................ 82/113 |
| 4,939,964 A * | 7/1990 | Ricci ............................. 82/113 |
| 5,549,024 A * | 8/1996 | Ricci ............................. 82/113 |
| 5,660,093 A * | 8/1997 | Ricci ............................. 82/113 |
| 5,775,188 A * | 7/1998 | Strait ............................ 82/1.11 |
| 5,894,772 A * | 4/1999 | Nodar ............................ 82/113 |
| 6,065,378 A * | 5/2000 | Ricci ............................. 82/128 |
| 6,447,220 B1 * | 9/2002 | Ricci et al. .................. 408/72 R |
| 6,615,696 B2 * | 9/2003 | Ricci et al. ..................... 82/113 |
| 7,992,473 B2 * | 8/2011 | Marple et al. ................... 82/113 |

FOREIGN PATENT DOCUMENTS

| DE | 1931055 | 1/1966 |
|---|---|---|
| DE | 19503772 | 8/1996 |

* cited by examiner

*Primary Examiner* — Boyer D Ashley
*Assistant Examiner* — Sara Addisu
(74) *Attorney, Agent, or Firm* — David C. Purdue

(57) ABSTRACT

A device for cutting bar-shaped or tubular workpieces (1, 27), for example a peeling machine, is presented, in which, for the first time, the advance of the tools (7, 26, 44, 46) is brought about by a relative rotation between a toolholder (3, 25, 45) carrying the tools (7, 26, 44, 46) and an advancing sleeve (4, 24, 47). The toolholder (3, 25, 45) and advancing sleeve (4, 24, 47) are driven via gearwheels (19, 18) arranged on the same gear shaft (17) and having an oppositely oriented helical toothing. By means of an axial movement of the gear shaft (17), a relative rotation between the toolholder (3, 25, 45) and advancing sleeve (4, 24, 47) is achieved on account of the helical toothing.

Figure 1:
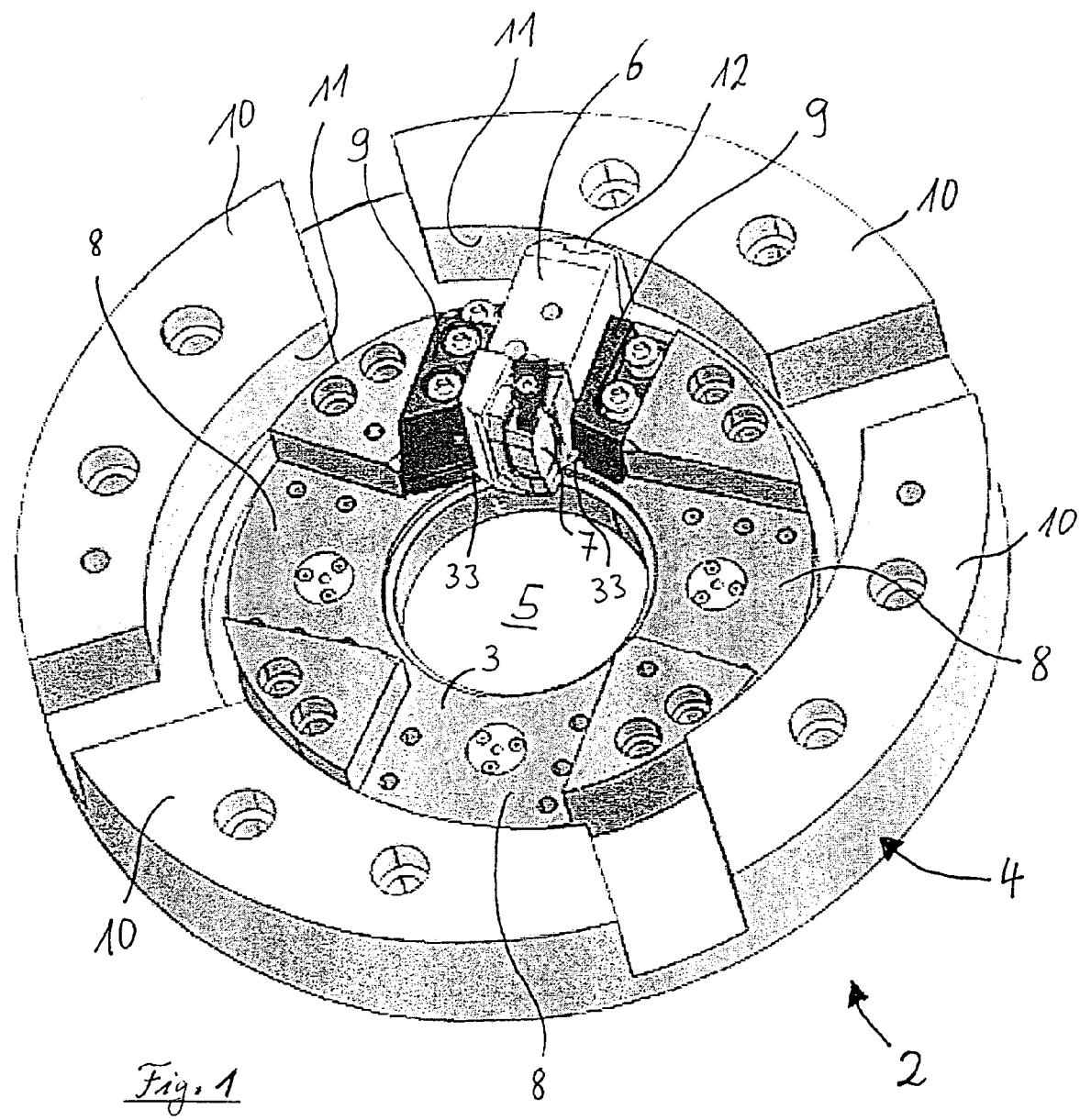

Moreover, it is proposed to use milling cutters (26, 44) as tools.

13 Claims, 4 Drawing Sheets

DEVICE FOR CUTTING BAR-SHAPED OR TUBULAR WORKPIECES

The invention relates to a device for cutting bar-shaped or tubular workpieces, comprising a driven toolholder which is provided with a passage for the workpiece to be machined and is mounted rotatably about the longitudinal axis of the workpiece to be machined, with a plurality of tools advanceable essentially in the radial direction, a driven advancing sleeve rotatably mounted concentrically to the toolholder, relative movement means for generating a relative movement between the toolholder and advancing sleeve and advancing means for converting the relative movement between the toolholder and advancing sleeve into an advancing movement of the tools.

A device of this type is known from DE 195 03 772 C2 as a machine for the peeling of tubes and bars (rotary peeling machine). Devices of this type are provided for peeling the surfaces of the bar-shaped or tubular workpieces on their circumference, in order to remove surface defects and/or to bring the workpieces to the desired diameter or diameters. For this purpose, the workpiece is guided in the direction of its longitudinal axis through the device, a plurality of peeling tools which rotate about this longitudinal axis machining the circumference by cutting.

To set a specific peeling diameter, but, in particular, also to compensate their wear, the tools can be advanced in the radial direction. According to the prior art mentioned, a conical sleeve is provided around the essentially disk-shaped toolholder. The tool holder and the conical sleeve rotate about the same axis at an identical angular speed. The peeling tools and the associated tool carrier bear in this case with their back against the inner face of the conical sleeve. In order, then, to achieve an advancing movement for the tools, the conical sleeve is displaced in the axial direction in relation to the toolholder, so that, by virtue of a decreasing inner radius of the conical sleeve, the tools are displaced radially in the direction of the axis of rotation.

In the machining of the maximum diameters, therefore, the tools or tool carriers bear against the front outer margin of the conical sleeve, and this, with regard to the high forces which occur, may lead to asymmetries and an uneven running of the tools and, consequently, to undesirable deviations from the roundness of the machined workpiece.

The object of the present invention is to make available a device of the type initially mentioned, with an alternative advancing mechanism, which does not have the abovementioned disadvantage.

In a device of the type initially mentioned, this object is achieved in that the relative movement between the toolholder and advancing sleeve is a relative rotation concentric to the axis of rotation of the toolholder.

Relative rotation between the advancing sleeve and toolholder thus means that the rotational speeds of the advancing sleeve and toolholder for the advancing movement must differ slightly from one another for a short time. Relative rotation, instead of axial relative movement, between the toolholder and advancing sleeve affords novel advantageous advancing possibilities. In particular, the situation is avoided where the tools or tool carriers have to be guided at the outer margin of a cone for the maximum machining diameters.

The device according to the invention may also be designed such that the advancing means for each tool comprise a tool guide provided on the advancing sleeve, each tool guide being arranged to run in the circumferential direction at a decreasing distance from the advancing sleeve axis of rotation, and each tool bearing directly or via a tool carrier against the associated tool guide.

The tool guides may be, for example, planar tracks, along which the backs of the tools or tool carriers slide during relative rotation between the advancing sleeve and toolholder. Alternatively, guidance via rotating elements, for example rolling bearings, may be envisaged.

Furthermore, it may be advantageous to design the device according to the invention such that the relative movement means comprise a gear with the following features:
a) a sleeve driving gearwheel engaging into a toothed rim of the advancing sleeve and arranged on a gear shaft, with a first helical toothing,
b) a holder driving gearwheel engaging into a toothed rim of the toolholder and arranged on the same gear shaft, with a second helical toothing oriented opposite to the first helical toothing, and
c) means for the controlled axial displacement of the gear shaft in relation to the advancing sleeve and/or to the toolholder.

The opposite orientation of the two helical toothings of the sleeve driving gearwheel and of the holder driving gearwheel means that the sleeve driving gearwheel is toothed with a righthand pitch and the toolholder driving gearwheel with a lefthand pitch or vice versa. If, then, the gear shaft is displaced axially in relation to the advancing sleeve and to the toolholder while the gear is running, this leads, because of the helical toothing, to a slight increase or reduction in the angular speed of the sleeve driving gearwheel or of the holder driving gearwheel during this displacement. For example, the holder driving gearwheel rotates somewhat more quickly and the sleeve driving gearwheel somewhat more slowly, so that a relative rotational movement occurs between the holder driving gearwheel and the sleeve driving gearwheel. The relative rotation for the advancing movement is consequently integrated directly into the drive for the toolholder and the advancing sleeve.

The device according to the invention may also be designed such that the holder driving gearwheel or the sleeve driving gearwheel is driven by a main driving gearwheel.

Furthermore, the device according to the invention may be designed such that the tools are cutting knives.

Furthermore, the device according to the invention may be designed such that the tools are milling cutters.

Milling cutters have the tremendous advantage of a markedly increased machining speed. Although, as a rule, milling cutters are intended for surface machining, if cutting knives are replaced by milling cutters a sufficient accuracy in the roundness of the bar-shaped or tubular workpieces machined is achieved, furthermore, since, because of the shape of the tools and of the high rotational speed, the milling cutters essentially machine the workpiece only linearly.

The device according to the invention may also be designed such that the tools comprise both a set of cutting tools and a set of non-cutting tools. The cutting tools may be the already mentioned milling cutters or cutting knives.

In this case, the device according to the invention may advantageously also be designed such that the cutting tools and the non-cutting tools are arranged one behind the other, as seen in the direction of propulsion of the material to be machined, in such a way that the material to be machined is machined first by the cutting tools and subsequently by the non-cutting tools.

The non-cutting tools therefore serve for remachining.

In particular, it may be advantageous to design the device according to the invention such that the non-cutting tools are polishing tools, in particular those with polishing rollers.

Finally the device according to the invention may be designed such that the non-cutting tools serve at the same time as centering for the material to be machined.

Figure 2:
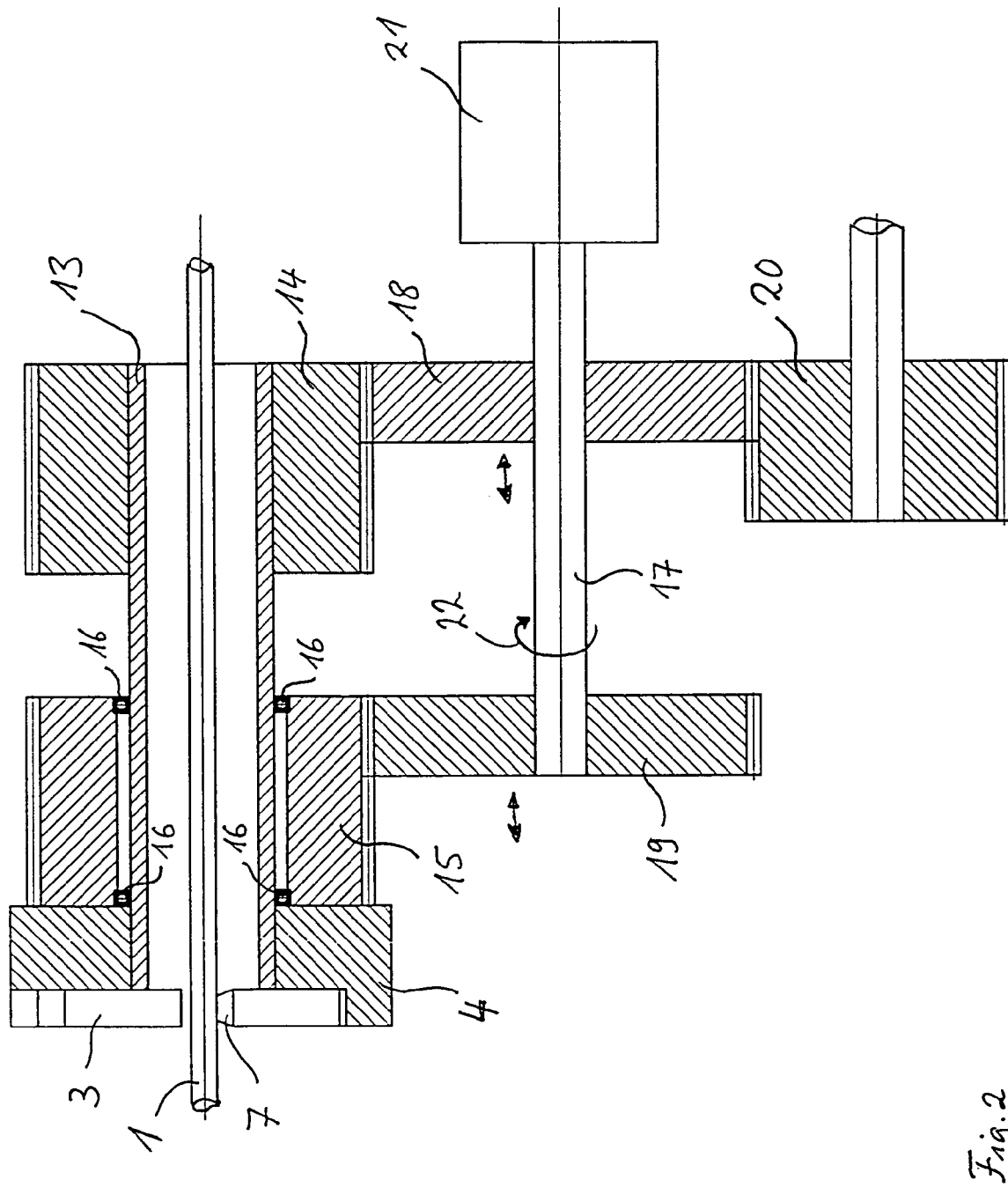
Figure 3:
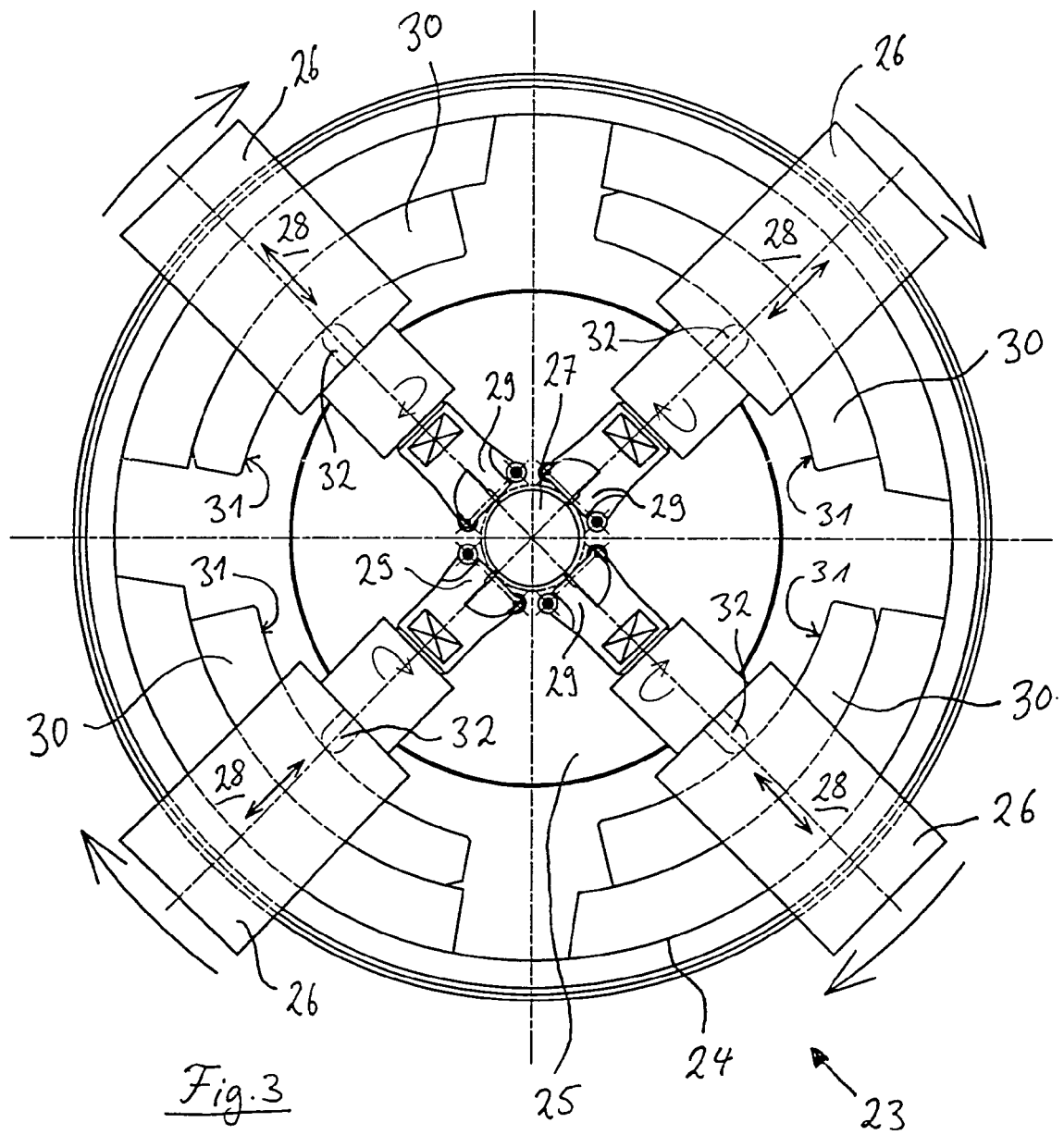
Figure 5:
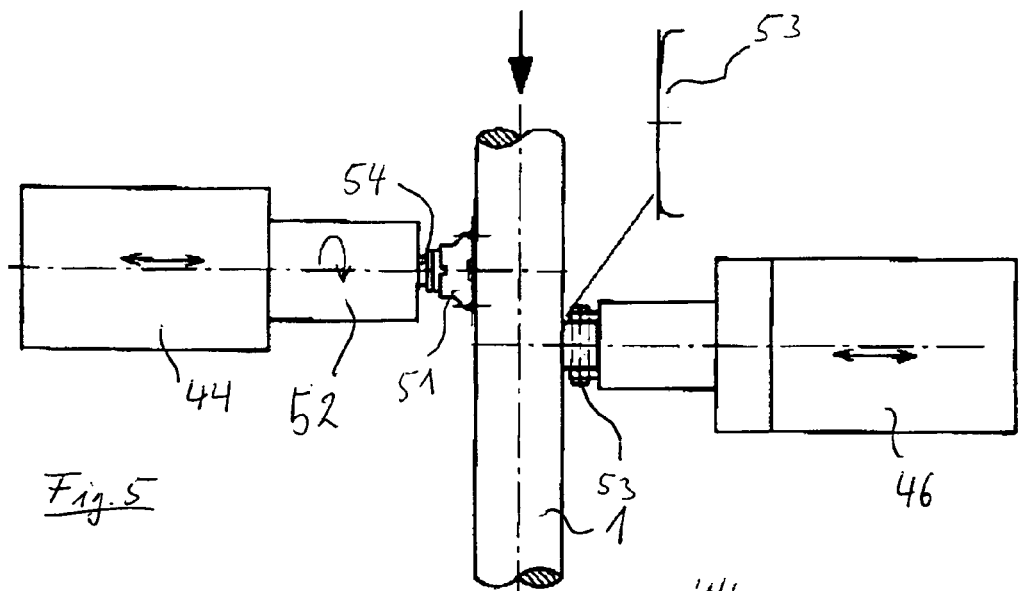
Figure 4:
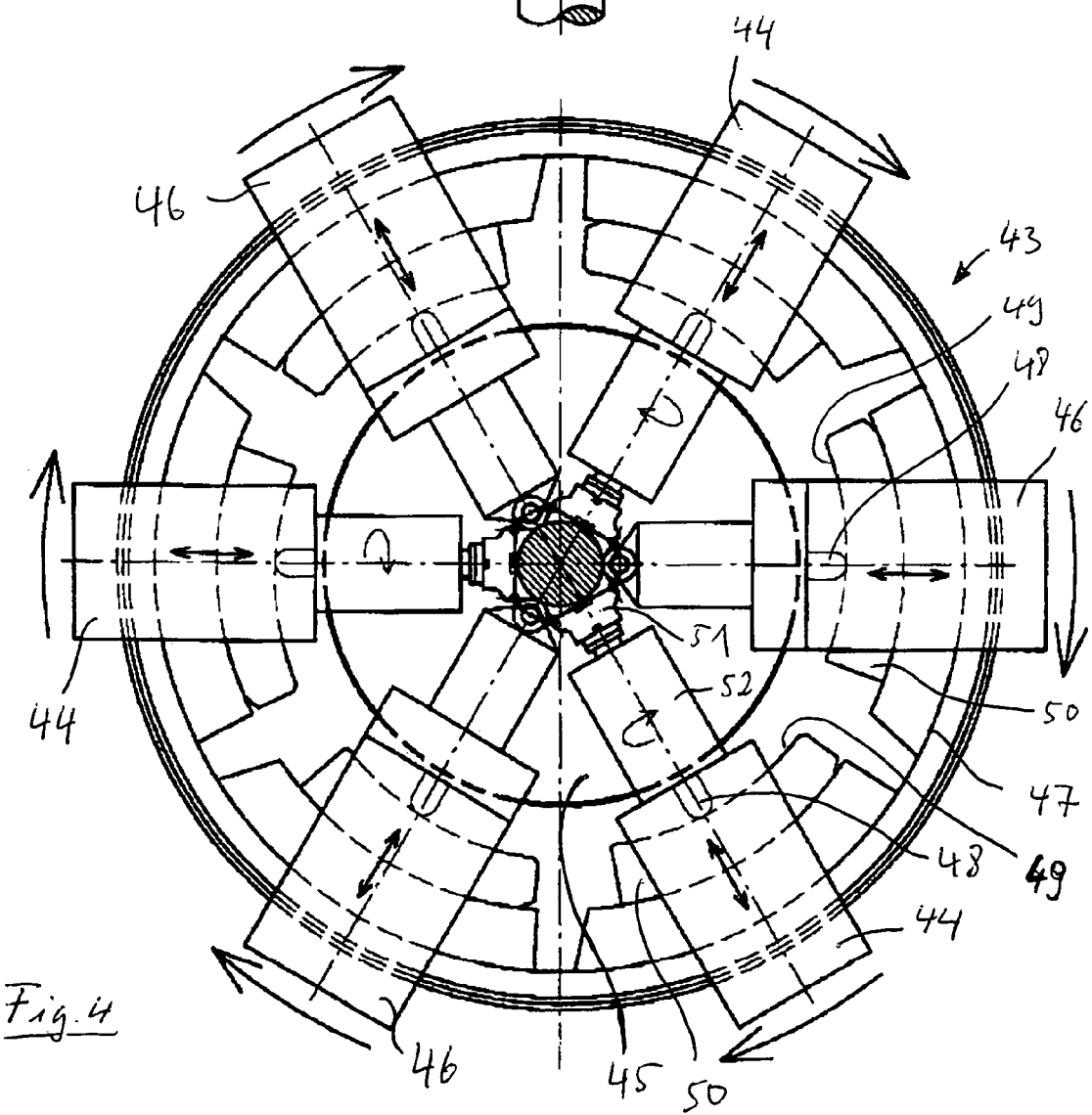

Exemplary embodiments of the invention are illustrated below with reference to figures in which, diagrammatically, FIG. 1 shows a perspective view of a peeling head, in which one of four peeling knives is illustrated, FIG. 2 shows a gear for driving the peeling head, FIG. 3 shows a peeling head with milling cutters, FIG. 4 shows a further peeling head with milling cutters and polishing rollers, and FIG. 5 shows a milling cutter and a polishing roller in a view perpendicular to FIG. 4.

FIGS. 1 and 2 show parts of a peeling machine for peeling the surface of bar-shaped workpieces 1. FIG. 1 shows a peeling head 2 of such a machine. The peeling head 2 consists of an essentially disk-shaped toolholder 3 and of an advancing sleeve 4, of which only a front part surrounding the toolholder 3 can be seen in FIG. 1. The toolholder 3 has centrally a passage orifice 5, through which the workpiece 1 (illustrated in FIG. 2) to be peeled is guided for machining. Fixed to the toolholder 3 is a tool carrier 6 which has a peeling knife 7 at its end pointing to the passage orifice 5. Only one tool carrier 6 is illustrated in FIG. 1 for the sake of greater clarity. In actual fact, overall, 4 tool carriers 6, each with a peeling knife 7, are provided, which are arranged correspondingly in the holding grooves 8 on the toolholder 3. The tool carriers 6 are fixed to the toolholder 3 by means of guide battens 9 which allow a displacement of the tool carrier 6 approximately in the radial direction. To avoid axial movement of the tool carriers 6, the guide battens 9 have shoulders 33 behind which the tool carrier 6 engages.

The essentially radial guidability of the tool carriers 6 serves, on the one hand, for setting the desired machining diameter and, also, for advancing on account of the progressive wear of the peeling knives 7.

The advancing sleeve 4 has a guide element 10 for each tool carrier 6. The guide elements 10 are block-shaped, with a planar guide face 11 which confronts the toolholder 3 and of which only two can be seen in FIG. 1 because of the perspective illustration. A tool carrier 6 is supported in each case on the guide faces by means of an exchangeable support element 12 attached to the rear end of the tool carrier 6. The guide faces 11 do not run concentrically to the advancing sleeve 4 and consequently to the toolholder 3, but, instead, continuously reduce the radius clockwise in their profile in FIG. 1. If, then, the toolholder 3 is rotated clockwise in relation to the advancing sleeve 4, the tool carrier 6 is displaced essentially radially inward via the support element 12 on account of the decreasing radius of the guide track 11. Thus, the desired radius can be set or the tool carrier 6 and consequently the peeling knife 7 can be advanced. The tool carrier 6 has uniform contact with the guide element 10 over the entire guide face 11, with the result that the peeling knife 7 can act with uniform force on the workpiece 1 in the case of all the machinable radii.

FIG. 2 illustrates the way in which a relative rotation between the toolholder 3 and advancing sleeve 4 is achieved during the machining of the workpiece 1. FIG. 2 shows a diagrammatic cross section of the gear for driving the advancing sleeve 4 and the toolholder 3. In FIG. 2, the toolholder 3 is illustrated only diagrammatically, with a peeling knife 7 which acts on the workpiece 1. Elements for guiding the workpiece 1 are not illustrated for the sake of greater clarity.

The toolholder 3 is connected firmly to a hollow shaft 13 which has toolholder toothed rim 14. The workpiece 1 is led through the hollow shaft 13. The advancing sleeve 4 is connected firmly to an advancing sleeve toothed rim 15 and is mounted rotatably on the hollow shaft 13 via a ball bearing 16. A holder driving gearwheel 18 and a sleeve driving gearwheel 19 are fixed on a common gear shaft 17, the holder driving gearwheel 18 engaging into the toolholder toothed rim 14 and the sleeve driving gearwheel 19 engaging into the advancing sleeve toothed rim 15. The holder driving gearwheel 18 is driven via a main driving gearwheel 20 which is driven, in turn, by a motor, not illustrated here. All the gearwheels 18 to 20 and toothed rims 14 and 15 illustrated here have a helical toothing. For example, the holder driving gearwheel 18 has a righthand-pitched toothing. The sleeve driving gearwheel 19 has an oppositely oriented, that is to say lefthand-pitched toothing. The toothed rims 14 and 15 cooperating with the holder gearwheel 18 and the sleeve driving gearwheel 19 have the toothing suitable for engagement and in each case oriented in opposition, as does the main driving gearwheel 20 engaging into the holder gearwheel 18. The gearwheels 18 and 19 and the toothed rims 14 and 15 are coordinated with one another such that the toolholder 3 and advancing sleeve 4 rotate at the same angular speed as long as the gear shaft 17 does not vary is axial position.

As already illustrated above, a relative rotation between the advancing sleeve 4 and toolholder 3 is necessary for advancing the peeling knife 7. To bring about such relative rotation, with the gear running, the gear shaft 17 is displaced in the axial direction in a defined way by means of an axial drive 21. At the same time, the holder driving gearwheel 18 and the sleeve driving gearwheel 19 are consequently displaced. So that the engagement of the holder driving gearwheel 18 and sleeve driving gearwheel 19 in the advancing sleeve toothed rim 15 or toolholder toothed rim 14 and the main driving gearwheel 20 remains ensured during displacement, the toolholder toothed rim 14, advancing sleeve toothed rim 15 and main driving gearwheel 20 are dimensioned correspondingly in their axial extent.

If the gear shaft 17 is displaced in the axial direction forward, that is to say to the left in the view in FIG. 2, in the direction of rotation illustrated by the arrow 22, because of the helical toothing the advancing sleeve toothed rim 15 is driven somewhat more slowly than without the axial movement, while the toolholder toothed rim 14 is driven somewhat more quickly than before. That is to say during the axial displacement of the gear shaft 17, the toolholder 3 rotates at a somewhat higher angular speed in comparison with the advancing sleeve 4, thus resulting in the desired relative rotation between the toolholder 3 and advancing sleeve 4. The higher angular speed of the toolholder 3 has the effect that the toolholder 3 is rotated clockwise with respect to the advancing sleeve 4 in the illustration in FIG. 1, with the result that the tool carrier 6 is advanced radially inward on account of the profile of the guide face 11.

By means of a measuring technique not illustrated in the figures, the radius of the machined workpiece 1 is established and can be used for controlling the axial position of the gear shaft 17.

FIG. 3 shows by way of example a further peeling head 23 with an advancing sleeve 24 and with a toolholder 25. Four milling cutters 26 for machining the bar-shaped workpiece 27 are provided here as tools. The milling cutters 26 are driven in each case by electric motors 28 for rotating the milling cutter head 29. The advancing sleeve 24 has for each milling cutter 6 a guide element 30 with a guide face 31 on which in each case a support element 32 of one of the milling cutters 26 is supported. The peeling head 23 according to FIG. 3 may be used in a machine with the gear according to FIG. 2 in exactly the same way as the peeling head 2 according FIG. 1. By means of a clockwise relative rotation of the toolholder 25 relative to the advancing sleeve 24, the milling cutters 26 are advanced in the radial direction toward the axis of rotation of the toolholder 25, in that the support elements 32 slide over the guide faces 31, of which the radius to the axis of rotation decreases continuously in their profile (clockwise, as seen in FIG. 3).

FIG. 4 shows a further peeling head 43 having only three milling cutters 44 which are fixed to a toolholder 45 in a way not illustrated here. In addition, three polishing tools 46 likewise fixed to the toolholder 45 are provided.

FIG. 5 shows the workpiece 1 to be machined, together with one of the milling cutters 44 and one of the polishing tools 46, in a side view. The arrow applied above the workpiece 1 shows the direction of propulsion of the workpiece 1 for machining. In each case a milling cutter 44 and a polishing tool 46 are arranged diametrically opposite one another, so that the radial forces exerted on the workpiece 1 by the milling cutter 44 and by the polishing tool 46 are directed opposite to one another. The milling cutter tools 44 are arranged with their longitudinal axes in a common plane perpendicular to the direction of propulsion of the workpiece 1, as are the polishing tools 46 correspondingly. The polishing tools 46 have at their front end a polishing roller 53 which, as illustrated in the top-right-hand part of the drawing of an enlarged detail in FIG. 5, bears with pressure over a certain length against the workpiece 1. The polishing tools 46 arranged in one plane, in addition to the polishing action, give rise at the same time, in interaction with the milling cutters 44, to a centering action. Both the milling cutters 44 and the polishing tools 46 are advanced toward the workpiece 1 by means of an advancing sleeve 47 in the same way as the milling cutters 26 in the example of FIG. 3, in that the advancing sleeve 47 is rotated in relation to the toolholder 45 about an axis concentric to the workpiece. Both the milling cutters 44 and the polishing tools 46 are supported in the radial direction by means of support elements 48 in each case on guide faces 49 of a guide element 50. Since the radius of the guide face 49 decreases clockwise, when the toolholder 45 is rotated clockwise in relation to the advancing sleeve 47, the respective milling cutter 44 or the respective polishing tool 46 is advanced toward the workpiece in the axial direction. To machine the workpiece 1, the entire peeling head 43 rotates, for example, clockwise. The propulsion of the workpiece 1 and the rotational speed of the peeling head 43 are in this case coordinated with one another such that the milling cutter heads 51 machine the entire workpiece circumference. The milling cutter heads 51 in this case rotate about their longitudinal axis. The enveloping piece 52 which is fixed in relation to the toolholder 45 surrounds the milling cutter shaft 54 driving the milling cutter head 51.

LIST OF REFERENCE SYMBOLS

1 Workpiece
2 Peeling head
3 Toolholder
4 Advancing sleeve
5 Passage orifice
6 Tool carrier
7 Peeling knife
8 Holding groove
9 Guide batten
10 Guide element
11 Guide face
12 Support element
13 Hollow shaft
14 Toolholder toothed rim
15 Advancing sleeve toothed rim
16 Ball bearing
17 Gear shaft
18 Holder driving gearwheel
19 Sleeve driving gearwheel
20 Main driving gearwheel
21 Axial drive
22 Running direction
23 Peeling head
24 Advancing sleeve
25 Toolholder
26 Milling cutter
27 Workpiece
28 Electric motor
29 Milling cutter head
30 Guide element
31 Guide face
32 Support element
33 Shoulder
43 Peeling head
44 Milling cutters
45 Toolholder
46 Polishing tool
47 Advancing sleeve
48 Support element
49 Guide face
50 Guide elements
51 Milling cutter head
52 Enveloping piece
53 Polishing roller
54 Milling cutter shaft

The invention claimed is:

1. A device for cutting bar-shaped or tubular workpieces (1, 27), comprising
 a) a driven toolholder (3, 25) which is provided with a passage (5) for the workpiece (1, 27) to be machined and is mounted rotatably about the longitudinal axis of the workpiece (1, 27) to be machined, with a plurality of tools (7, 26) advanceable essentially in the radial direction,
 b) a driven advancing sleeve (4, 24) rotatably mounted concentrically to the toolholder (3, 25),
 c) relative movement means for generating a relative movement between the toolholder (3, 25) and advancing sleeve (4, 24), said relative movement means comprising a gear and
  aa) a sleeve driving gearwheel (19) for engaging a toothed rim (15) of the advancing sleeve (4, 24) and arranged on a gear shaft (17), with a first helical toothing,
  bb) a holder driving gearwheel (18) for engaging a toothed rim (14) of the toolholder (3, 25) and arranged on the same gear shaft (17), with a second helical toothing oriented opposite to the first helical toothing, and
  cc) means (21) for controlling axial displacement of the gear shaft (17) in relation to the advancing sleeve (4, 24) and/or to the toolholder (3, 25), and
 d) advancing means for converting the relative movement between the toolholder (3, 25) and advancing sleeve (4, 24) into an advancing movement of the tools (7, 26), wherein aaa) the advancing means for each tool (7, 26) comprises a tool guide (11, 31) provided on the advancing sleeve (4, 24), each tool guide (11, 31) being arranged to run in the circumferential direction at a decreasing distance from the advancing sleeve axis of rotation bbb) the relative movement between the toolholder (3, 25) and advancing sleeve (4, 24) is a relative rotation concentric to the axis of rotation of the toolholder (3, 25), and ccc) each tool (7, 26) bears directly or via a tool carrier (6) against the associated tool guide (11, 31).

2. The device as claimed in claim 1, characterized in that the holder driving gearwheel (18) or the sleeve driving gearwheel (19) is driven by a main driving gearwheel (20).

3. The device as claimed in claim 1, characterized in that the tools comprise both a set of cutting tools (7, 26, 44) and a set of non-cutting tools (46).

4. The device as claimed in claim 3, characterized in that the non-cutting tools are polishing tools (46).

5. The device as claimed in claim 4, characterized in that the polishing tools (46) have polishing rollers (53).

6. The device as claimed in claim 5, characterized in that the non-cutting tools (46) serve at the same time as centering for the material (1, 27) to be machined.

7. The device as claimed in claim 4, characterized in that the non-cutting tools (46) serve at the same time as centering for the material (1, 27) to be machined.

8. The device as claimed in claim 3, characterized in that the non-cutting tools (46) serve at the same time as centering for the material (1, 27) to be machined.

9. The device as claimed in claim 3, characterized in that the cutting tools (7, 26, 44) and the non-cutting tools (46) are arranged one behind the other, as seen in the direction of propulsion of the material (1, 27) to be machined, in such a way that the material (1, 27) to be machined is machined first by the cutting tools (7, 26, 44) and subsequently by the non-cutting tools (46).

10. The device as claimed in claim 9, characterized in that the non-cutting tools are polishing tools (46).

11. The device as claimed in claim 10, characterized in that the polishing tools (46) have polishing rollers (53).

12. The device as claimed in claim 11, characterized in that the non-cutting tools (46) serve at the same time as centering for the material (1, 27) to be machined.

13. The device as claimed in claim 9, characterized in that the non-cutting tools (46) serve at the same time as centering for the material (1, 27) to be machined.

* * * * *